(12) United States Patent
Madasu et al.

(10) Patent No.: US 11,421,515 B2
(45) Date of Patent: Aug. 23, 2022

(54) METHODOLOGY FOR DEVELOPING TREATMENT FLUID COMPOSITIONS TO ENHANCE NEAR- AND FAR-FIELD DIVERSION DOWNHOLE

(71) Applicant: Halliburton Energy Services, Inc., Houston, TX (US)

(72) Inventors: Srinath Madasu, Houston, TX (US); Dipti Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 663 days.

(21) Appl. No.: 16/332,748

(22) PCT Filed: Dec. 9, 2016

(86) PCT No.: PCT/US2016/065823
§ 371 (c)(1),
(2) Date: Mar. 12, 2019

(87) PCT Pub. No.: WO2018/106259
PCT Pub. Date: Jun. 14, 2018

(65) Prior Publication Data
US 2021/0277755 A1 Sep. 9, 2021

(51) Int. Cl.
*C09K 8/84* (2006.01)
*E21B 43/12* (2006.01)

(52) U.S. Cl.
CPC .............. *E21B 43/12* (2013.01); *C09K 8/84* (2013.01); *C09K 2208/10* (2013.01); *E21B 2200/20* (2020.05)

(58) Field of Classification Search
CPC ........ C09K 2208/10; C09K 8/57; C09K 8/66; C09K 8/84; E21B 2200/20; E21B 43/12; G06F 9/445; C06F 17/11; G01V 99/00
See application file for complete search history.

(56) References Cited

U.S. PATENT DOCUMENTS

| | | | |
|---|---|---|---|
| 8,997,868 | B2 | 4/2015 | Nguyen et al. |
| 9,418,184 | B2 | 8/2016 | Kulkarni et al. |
| 2003/0134751 | A1 | 7/2003 | Lee et al. |

(Continued)

FOREIGN PATENT DOCUMENTS

| | | |
|---|---|---|
| WO | 2011154712 A1 | 12/2011 |
| WO | 2015026355 A1 | 2/2015 |
| WO | 2015031527 A1 | 3/2015 |

OTHER PUBLICATIONS

International Search Report & Written Opinion issued in corresponding International Application No. PCT/US2016/065823 dated Sep. 12, 2017. (15 pages).

*Primary Examiner* — Alicia Bland
(74) *Attorney, Agent, or Firm* — McGuireWoods LLP (57) ABSTRACT

A method comprises: deriving fluid properties that provide for suspension of particulate diverting agents using a 3-dimensional flow model and based on a downhole temperature and at least one size characteristic of the particulate diverting agents; identifying a treatment fluid composition that comprises a nanoparticulate suspending agent and achieves the fluid properties using a relationship between the treatment fluid composition and the fluid properties; and preparing a treatment fluid or a treatment fluid additive based on the treatment fluid composition.

15 Claims, 7 Drawing Sheets

(56) References Cited

U.S. PATENT DOCUMENTS

| | | | |
|---|---|---|---|
| 2008/0153720 A1 | 6/2008 | Huang et al. | |
| 2010/0224365 A1* | 9/2010 | Abad | E21B 43/26 166/275 |
| 2013/0341020 A1* | 12/2013 | Nguyen | E21B 33/138 166/270.1 |
| 2015/0024976 A1 | 1/2015 | Albrighton et al. | |
| 2015/0066455 A1 | 3/2015 | Madasu et al. | |
| 2016/0341850 A1 | 11/2016 | Lin et al. | |
| 2019/0309604 A1* | 10/2019 | Madasu | E21B 43/16 |

* cited by examiner

METHODOLOGY FOR DEVELOPING TREATMENT FLUID COMPOSITIONS TO ENHANCE NEAR- AND FAR-FIELD DIVERSION DOWNHOLE

BACKGROUND

The present application relates to a methodology for developing treatment fluid compositions to enhance near- and far-field diversion downhole.

Treatment fluids may be used in a variety of subterranean treatments. As used herein, the term "treatment," or "treating," refers to any subterranean operation that uses a fluid in conjunction with a desired function and/or for a desired purpose. The terms "treatment," and "treating," as used herein, do not imply any particular action by the fluid or any particular component thereof. Examples of common subterranean treatments include, but are not limited to, drilling operations, pre-pad treatments, fracturing operations, perforation operations, preflush treatments, afterflush treatments, sand control treatments (e.g., gravel packing), acidizing treatments (e.g., matrix acidizing or fracture acidizing), "frac-pack" treatments, cementing treatments, water control treatments, fluid loss control treatments (e.g., gel pills), and well bore clean-out treatments.

In subterranean treatments, it is often desired to treat an interval of a subterranean formation having sections of varying permeability, porosity, damage, and/or reservoir pressures, which may cause the sections to accept varying amounts of certain treatment fluids. For example, low reservoir pressure in certain areas of a subterranean formation or proppant pack with high porosity may permit that portion of the formation to accept larger amounts of certain treatment fluids. It may be difficult to obtain a uniform distribution of the treatment fluid throughout the entire interval. For instance, the treatment fluid may preferentially enter portions of the interval with low fluid flow resistance at the expense of portions of the interval with higher fluid flow resistance. In some instances, these intervals with variable flow resistance may be water-producing intervals. In other instances, the portion of an interval with low fluid flow resistance may be an elbow or turn in a well bore, into which the treatment fluid may preferentially enter. In yet other instances, the portion of an interval with low fluid flow resistance may be a junction of a multi-lateral well, into which the treatment fluid may preferentially enter.

In conventional methods of treating such subterranean formations, once the less fluid flow-resistant portions of a subterranean formation have been treated, that area may be sealed off using variety of techniques to divert treatment fluids to more fluid flow-resistant portions of the interval. Such techniques may have involved, among other things, the injection of particulates, foams, plugs, packers, or blocking polymers (e.g., crosslinked aqueous gels) into the interval so as to substantially plug off high-permeability portions of the subterranean formation once they have been treated, thereby diverting subsequently injected fluids to more fluid flow-resistant portions of the subterranean formation.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to a methodology for developing treatment fluid compositions to enhance near- and far-field diversion downhole. More specifically, the present application uses a 3-dimensional flow model to predict a fluid viscosity required to suspend particulate diverting agents.

The treatment fluids of the present application may comprise an aqueous base fluid, particulate diverting agents, and nanoparticulate suspending agents. Optionally, the treatment fluids may further comprise viscosifiers. Optionally, the treatment fluids may further comprise additives that include, but are not limited to, emulsifiers, dispersion aids, corrosion inhibitors, emulsion thinners, emulsion thickeners, foaming agents, gases, pH control additives, breakers, biocides, crosslinkers, stabilizers, chelating agents, scale inhibitors, gas hydrate inhibitors, oxidizers, reducers, friction reducers, and the like, and any combination thereof.

As used herein, the term "particle," "particulate," and grammatical variations thereof includes all known shapes of materials, including substantially spherical materials, fibrous materials, polygonal materials (such as cubic materials), and combinations thereof. These terms encompass solid materials, colloidal gels, and the like. As used herein, the term "size characteristic" refers to a metric(s) associated with the size of the particulates. Exemplary size characteristics may include, but are not limited to, an average value, a median value, a d-value, a mesh value, or the like for the diameter (i.e., smallest cross-sectional dimension), the length of the particle (i.e., the largest cross-sectional dimension), the aspect ratio (i.e., a ratio of smallest cross-sectional dimension and the largest cross-sectional diameter perpendicular to the smallest cross-sectional diameter), the volume, the hydrodynamic diameter (i.e., the diameter of a hypothetical hard sphere that diffuses through a liquid in the same fashion as the particle being measured), or the like of the particulates. The average value, the median value, or the d-value may be based on a particle size number distribution, particle size weight distribution, or a particle size volume distribution, or variants thereof. The size characteristic may be a range of values or a specific value of the foregoing examples. In some instances, one or more size characteristics for example, two or more size characteristic (e.g., using both length of the particle and the hydrodynamic diameter) may be used in the methods, systems, and analyses described herein.

As used herein, the term "particulate diverting agent" refers to a particulate material that functions to reduce or prevent, either temporarily or permanently, the flow of a fluid into a particular location, usually located in a subterranean formation, wherein the material serves to at least partially obstruct the location and thereby cause the fluid to "divert" to a different location. As used herein, the term "near-field diversion" refers to diversion that occurs within 5 feet into the subterranean formation measured from the wellbore wall. As used herein, the term "far-field diversion" refers to diversion that occurs past 5 feet (and preferable over 20 feet and extending to or beyond the fracture half-length, e.g., over 1,000 feet) into the subterranean formation measured from the wellbore wall. As used herein, the term "fracture half-length" refers to a distance that is half the length of the fracture.

Exemplary particulate diverting agents may include, but are not limited to, polysaccharides, lignosulfonates, chitins, chitosans, proteins, fatty alcohols, fatty esters, fatty acid salts, aliphatic polyesters, poly(lactic acid), poly(glycolic acid), poly(ε-caprolactones), polyoxymethylene, polyurethanes, poly(hydroxybutyrates), poly(anhydrides), aliphatic polycarbonates, polyvinyl polymers, acrylic-based polymers, poly(amino acids), poly(aspartic acid), poly(alkylene oxides), poly(ethylene oxides), polyphosphazenes, poly(orthoesters), poly(hydroxy ester ethers), polyether esters, polyester amides, polyamides, polyhydroxyalkanoates, polyethyleneterephthalates, polybutyleneterephthalates, polyethylenenaphthalenates, copolymers thereof, and any combination thereof. As used herein, the term "copolymer" refers to a polymer that includes two or more different monomeric units, which may be combined, for example, as graft polymers, block copolymers, terpolymers, random copolymers, and the like. Some nonlimiting examples of copolymers may include (1) copolymers lactic acid with other hydroxy-, carboxylic acid-, or hydroxycarboxylic acid-containing moieties and (2) polymers of glycolic acid with other hydroxy-, carboxylic acid-, or hydroxycarboxylic acid-containing moieties. One exemplary copolymer is a copolymer of lactic acid and glycolic acid.

In some embodiments, particulate diverting agents may have an average diameter based on particle size number distribution of about 0.1 microns to about 3000 microns (e.g., about 0.1 microns to about 100 microns, about 1 micron to about 100 microns, about 1 micron to about 500 microns, about 10 microns to about 100 microns, about 10 microns to about 250 microns, about 100 microns to about 500 microns, about 100 microns to about 1000 microns, about 500 microns to about 3000 microns, and about 1000 microns to about 3000 microns).

The particulate diverting agents may be included in the treatment fluid at a concentration of about 0.01% to about 80% by weight of the treatment fluid (e.g., about 0.01% to about 5%, about 0.1% to about 5%, about 0.1% to about 10%, about 1% to about 10%, about 1% to about 25%, about 5% to about 25%, about 10% to about 25%, about 10% to about 50%, about 25% to about 50%, about 25% to about 80%, about 40% to about 80%, or about 50% to about 80% by weight of the treatment fluid).

As used herein, the term "nanoparticulate suspending agents" refers to a particulate material with an average diameter based on particle size number distribution less than 500 nm. In some embodiments, nanoparticulate suspending agents may have an average diameter based on particle size number distribution of about 2 nm to about 500 nm (e.g., about 2 nm to about 10 nm, about 2 nm to about 100 nm, about 2 nm to about 250 nm, about 10 nm to about 100 nm, about 10 nm to about 250 nm, about 25 nm to about 250 nm, about 25 nm to about 400 nm, about 25 nm to about 500 nm, about 100 nm to about 250 nm, or about 100 nm to about 500 nm).

In some embodiments, nanoparticulate suspending agents may be polymer nanoparticle formed of natural or synthetic clays. Exemplary clays may include, but are not limited to, silicates, phyllosillicates, and a combination thereof. The silicates and phyllosilicates can include elements of groups 1, and 2 of the periodic table, as well as transition metals, including magnesium, aluminum, potassium, lithium, iron, or calcium, or combinations thereof. The silicates and phyllosillicates may include hydroxyl groups. Exemplary phyllosillicates include magnesium silicate, hectorite, bentonite, montmorillonite, beidellite, attapulgite, kalonite, meta kalonite, laponite, sepiolite, and combinations thereof. For example, a nanoparticulate suspending agent may, in some instances, include the synthetic hydrous magnesium silicate clay known by the trade name LAPONITE® rheological additive, which is commercially available from BYK Additives Inc. (formerly Rockwood Additives). In another example, laponite, like other clays disclosed herein, may be used as a rheology modifier in aqueous solutions to impart thixotropic, shear sensitive viscosity and improve stability and syneresis control in certain commercial applications. In certain illustrative embodiments, the laponite may be LAPONITE® RD rheological additive, commercially available from BYK Additives Inc. In another example, a nanoparticulate suspending agent may, in some instances, include a synthetic hectorite known as THERMAVIS® viscosifier, sold by Halliburton Energy Services, Inc.

The nanoparticulate suspending agents may be included in the treatment fluid at a concentration of about 0.01% to about 25% by weight of the treatment fluid (e.g., about 0.01% to about 5%, about 0.1% to about 5%, about 0.1% to about 10%, about 1% to about 10%, about 1% to about 25%, about 5% to about 25%, or about 10% to about 25% by weight of the treatment fluid).

Exemplary viscosifiers may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellu lose, and carboxymethylhydroxyethylcellulose), xanthan, scleroglucan, succinoglycan, diutan, any salt thereof, and any combination thereof.

The viscosifiers may be included in the treatment fluid at a concentration of about 0.01% to about 15% by weight of the treatment fluid (e.g., about 0.01% to about 5%, about 0.1% to about 5%, about 0.1% to about 10%, about 1% to about 10%, about 1% to about 15%, about 5% to about 15%, or about 10% to about 15% by weight of the treatment fluid).

In some embodiments, aqueous base fluids suitable for use in conjunction with the treatment fluids described herein may include, but are not limited to, aqueous fluid, aqueous-miscible fluids, and any combination thereof. Aqueous fluids may, in some embodiments, include, but are not limited to, fresh water, saltwater (e.g., water containing one or more salts dissolved therein), brine (e.g., saturated salt water), seawater, and any combination thereof. Suitable aqueous-miscible fluids may, in some embodiments, include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous fluid described above, and any combination thereof.

In some preferred embodiments, the treatment fluid may comprise an aqueous base fluid, poly(lactic acid) particulate diverting agents, hectorite nanoparticulate suspending agents, and, optionally, a salt of a carboxymethylcellulose viscosifier (or alternatively or in combination a salt of a guar viscosifier).

In some embodiments, a 3-dimensional flow model may be used to predict a fluid viscosity required to suspend particulate diverting agents. The fluid viscosity is then achieved by adjusting the concentration of the nanoparticulate suspending aids and, optionally, the viscosifiers.

Figure 1:
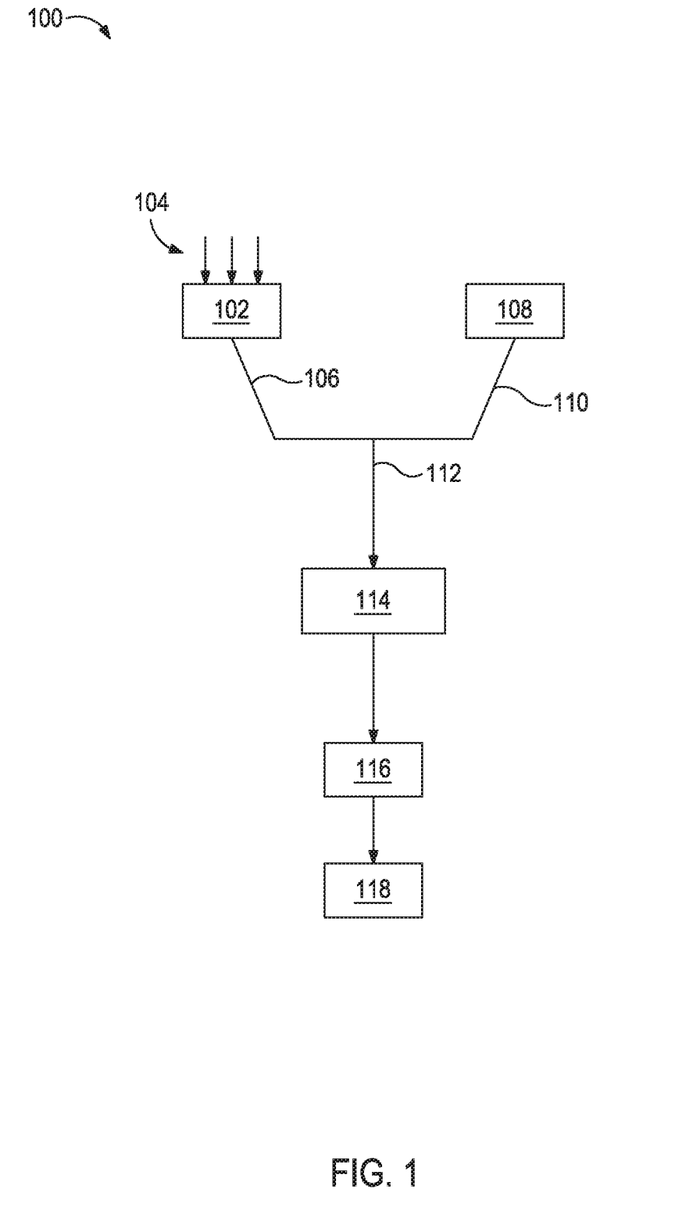
FIG. 1 illustrates a schematic of an exemplary embodiment that applies a 3-dimensional flow model to predict fluid viscosity.

FIG. 1 illustrates a schematic of an exemplary embodiment 100 that applies a 3-dimensional flow model 102 to predict fluid viscosity. The 3-dimensional flow model 102 is based on the Navier-Stokes equations (e.g., Equations 1 and 2) that describe the motion of viscous fluid substances.

$$\frac{\partial \rho}{\partial t} + \nabla \cdot \rho u = 0 \qquad \text{Equation 1}$$

$$\frac{\partial \rho u}{\partial t} + \nabla \cdot \rho u u + \nabla p + \nabla \cdot \tau + \rho \hat{g} = 0 \qquad \text{Equation 2}$$

where $\rho$ is the fluid density, u is the velocity vector, t is the time, p is the fluid pressure, $\tau$ is the fluid viscous stress, g is the gravity, $\nabla$ is a del operator, · indicates a dot product, and ^ indicates a vector.

The inputs 104 for the 3-dimensional flow model 102 include the treatment fluid properties, the temperature, and the size characteristics of the particulate diverting agents. Generally, the treatment fluid properties are varied at a specific temperature (e.g., the estimated downhole temperature) to identify the fluid properties 106 needed to suspend and transport the particulate diverting agent. In some instances, the temperature and/or dimensions of the particulate diverting agents may also be varied.

The fluid properties 106 needed to suspend and transport the particulate diverting agent may be based on the amount of particulate diverting agent settling calculated by the 3-dimensional flow model 102. For example, for near-field diversion, the particulate diverting agent preferably does not penetrate far into the subterranean formation. Accordingly, the fluid properties 106 may be chosen to provide for settling of the particulate diverting agent over short distances (e.g., at least 50% of the particulate diverting agent is within the bottom 10% of the fracture height at a 5-foot distance from the wellbore). By contrast, if far-field diversion is desired, the fluid properties 106 may be chosen to provide for little to no settling of the particulate diverting agent over short and long distances (e.g., less than 25% of the particulate diverting agent is within the bottom 10% of the fracture height at a fracture half-length, less than 25% of the particulate diverting agent is within the bottom 10% of the fracture height at a 100-foot distance from the wellbore, or less than 25% of the particulate diverting agent is within the bottom 10% of the fracture height at a 1,000-foot distance from the wellbore).

The output of the 3-dimensional flow model 102 (i.e., the fluid properties 106 needed to suspend and transport the particulate diverting agent) may be absolute fluid properties 106 values, threshold or minimum fluid properties 106 values, or a range of the minimum to maximum fluid properties 106 values that suspend the particulate diverting agents while remaining a pumpable treatment fluid.

In some embodiments, lab experiments 108 may be performed to derive a relationship 110 between the size characteristics of the nanoparticulate suspending agents and fluid properties. Exemplary fluid properties may include, but are not limited to, dynamic viscosity (also known as shear viscosity), kinematic viscosity, elasticity (storage modulus) (e.g., derived from rheological data), and the like, and any combination thereof.

Alternatively, the lab experiments 108 may be omitted when the relationship 110 between the size characteristics of the nanoparticulate suspending agents and fluid properties is provided (e.g., as a table in a computer program or manual).

The output of the 3-dimensional flow model 102 (i.e., the fluid properties 106 needed to suspend and transport the particulate diverting agent) or provided fluid properties 106 may be a table, a graph, a matrix, an equation, or other mathematic representation of the relationship 110.

The fluid properties 106 needed to suspend and transport the particulate diverting agent may be compared 112 with the relationship 110 between the size characteristics of the nanoparticulate suspending agents and fluid properties to identify a fluid composition(s) 114 (e.g., the concentration and dimensions of nanoparticulate suspending agents and, optionally, the viscosifier) that achieves the necessary fluid properties 106.

Then, the treatment fluid 116 or a corresponding treatment fluid additive may be produced according to the fluid composition(s) 114 that achieves the necessary fluid properties 106. In some embodiments, the treatment fluid additive may comprise the particulate diverting agents, the nanoparticulate suspending agents, and the viscosifier (when used). In some embodiments, the treatment fluid additive may comprise the nanoparticulate suspending agents and the viscosifier (when used).

The treatment fluid 116 may be used to treat 118 a subterranean formation for a diversion step in a given downhole treatment. Exemplary downhole treatments that include diversion steps may include, but are not limited to, fracturing operations (for fracturing or proppant placement), cementing operations, acidizing operations, drilling operations, and the like.

In some instances, the methods described herein that utilize a 3-dimensional flow model 102 to ascertain fluid composition(s) 114 with fluid properties 106 needed to suspend and transport the particulate diverting agent may be performed when developing or otherwise planning a downhole treatment.

In some instances, the methods described herein that utilize a 3-dimensional flow model 102 to ascertain fluid composition(s) 114 with fluid properties 106 needed to suspend and transport the particulate diverting agent may be performed at a well site and allow for on-the-fly adjustment of the fluid composition(s) 114 to achieve the necessary fluid properties 106.

Figure 2:
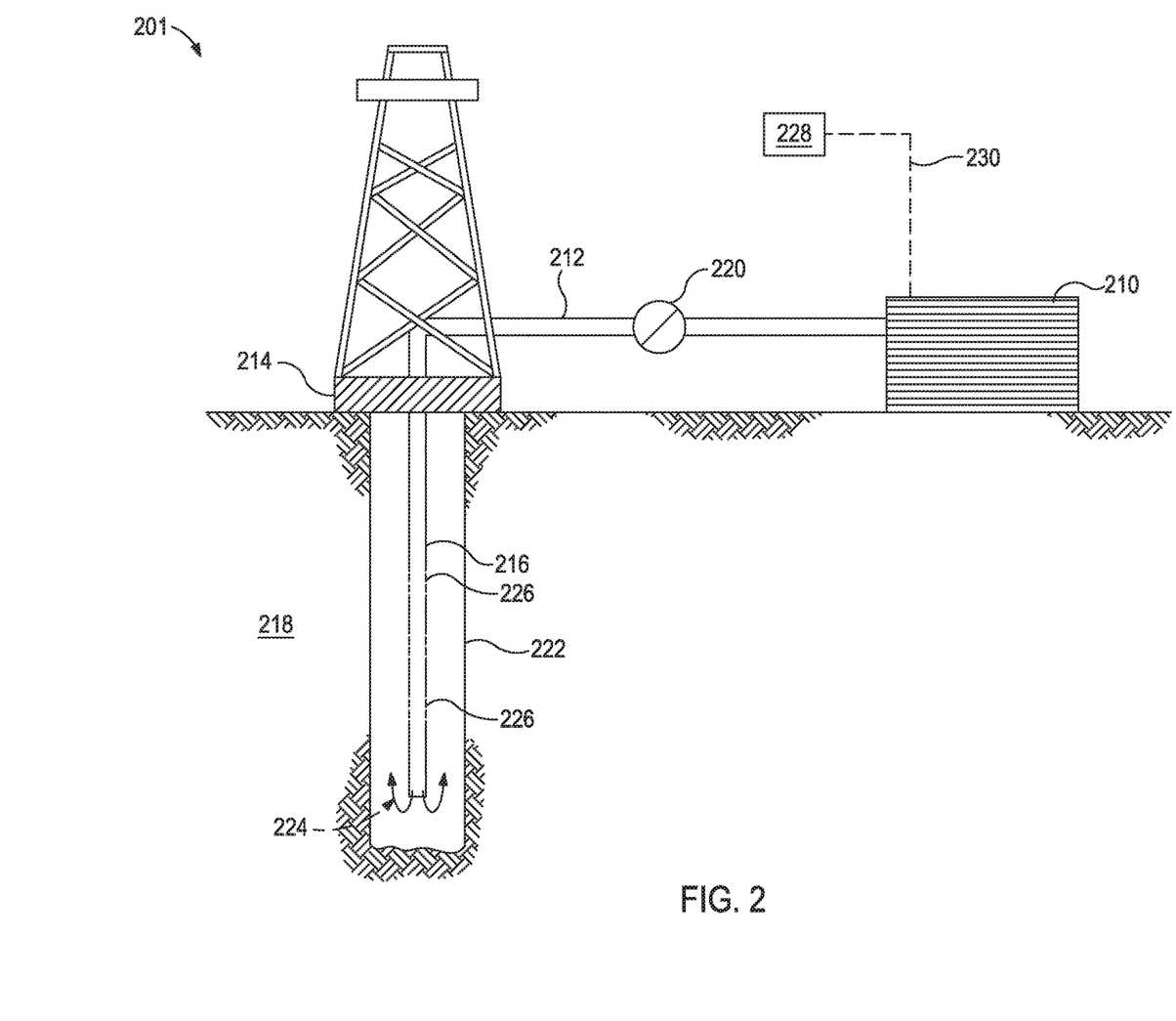
FIG. 2 shows an illustrative schematic of a system that can deliver treatment fluids of the present disclosure to a downhole location for a downhole treatment.
Figure 3:
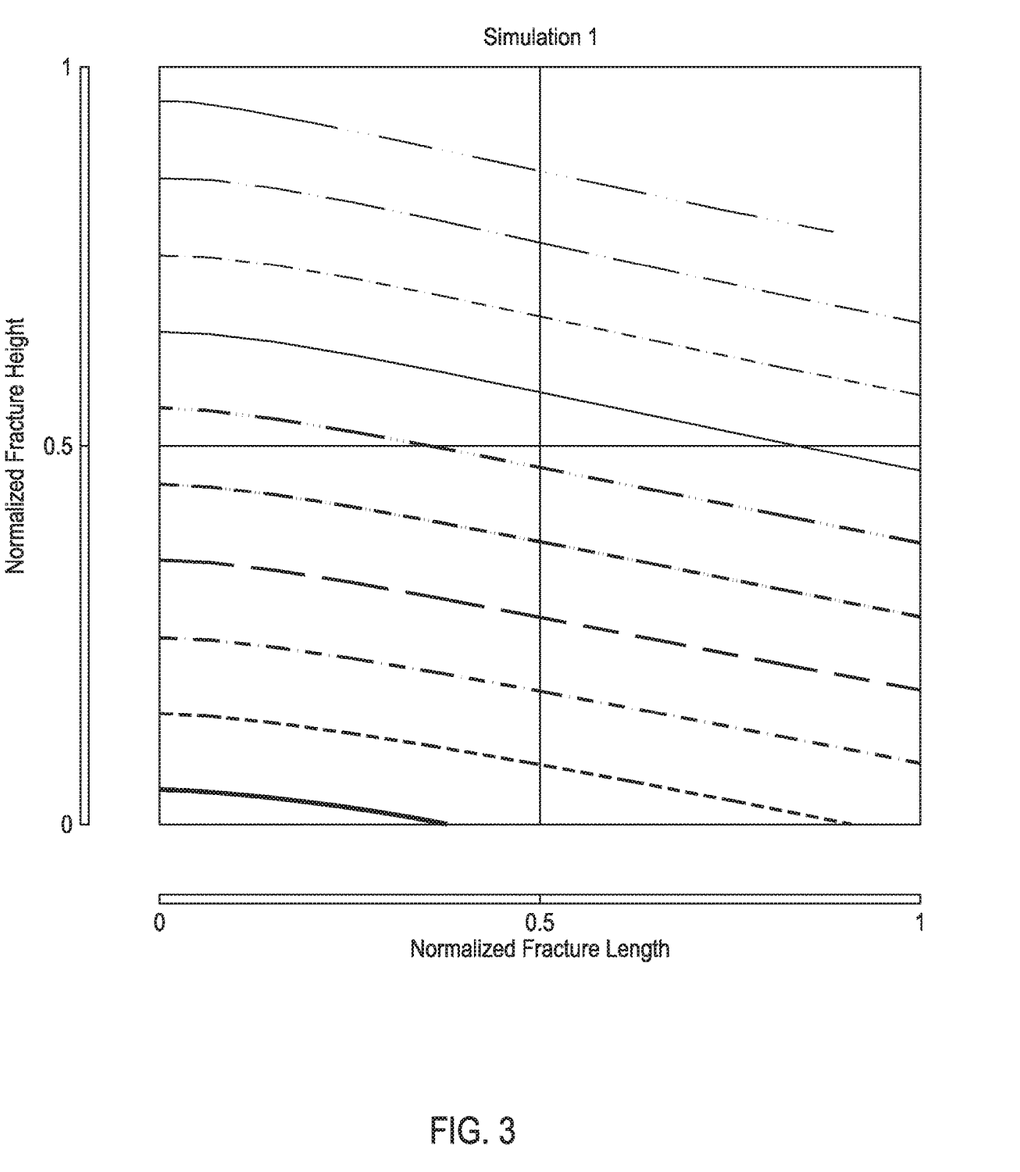
FIGS. 3-7 are 3-dimensional flow modeling results of the movement of the individual diverting agent particles for different viscosities and particulate diverting agent density.
Figure 4:
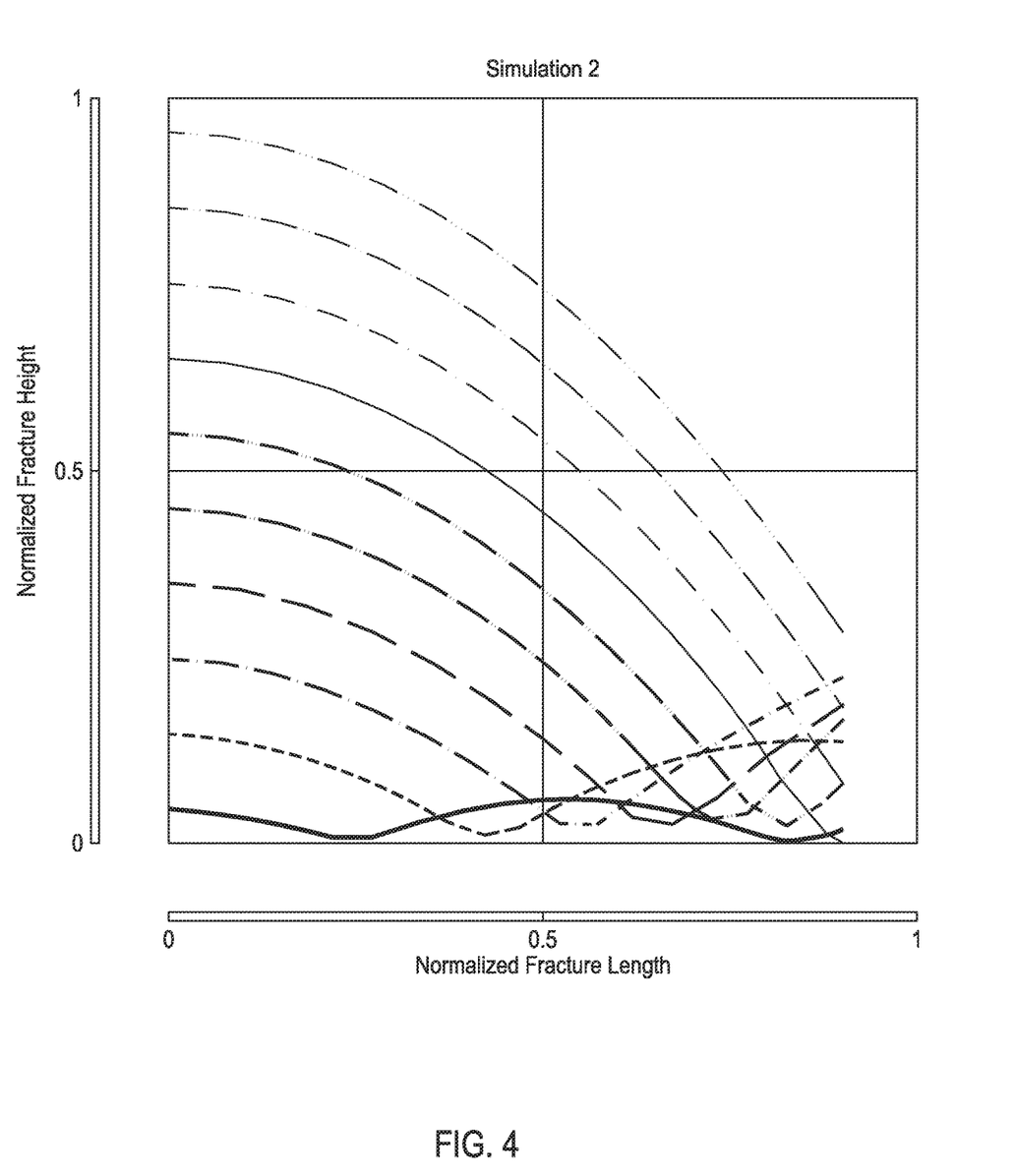
Figure 5:
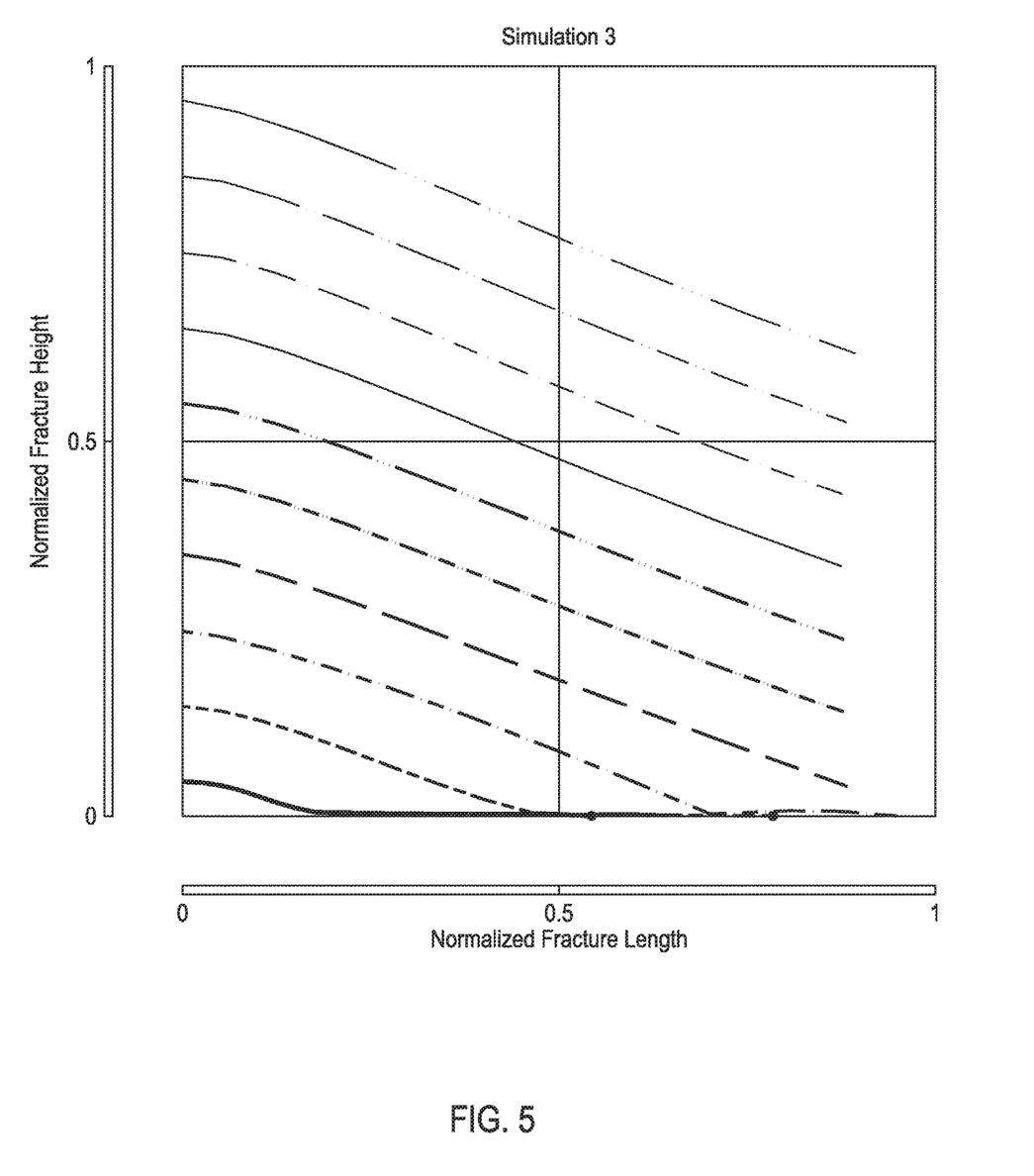
Figure 6:
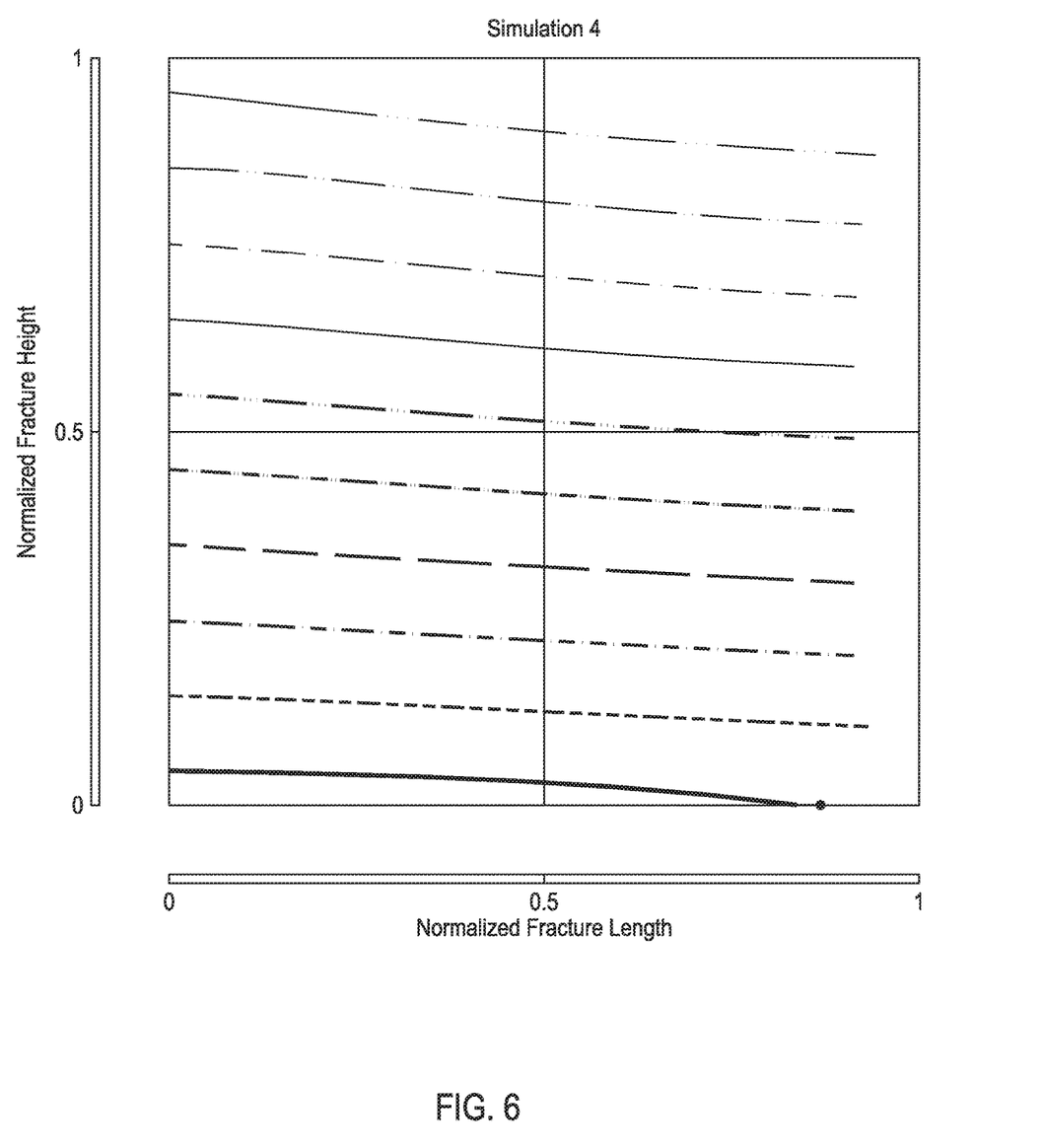
Figure 7:
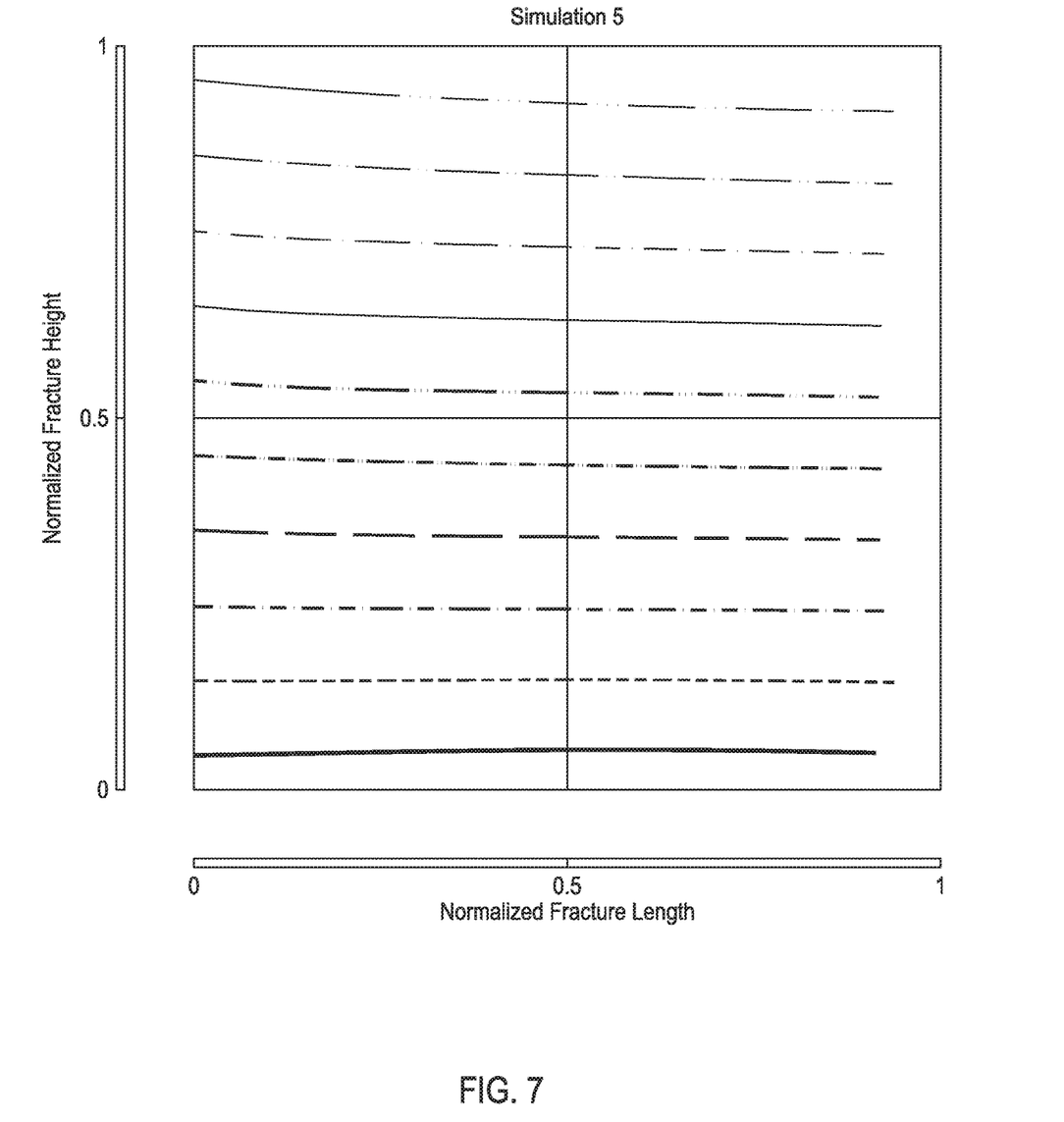

FIG. 2 shows an illustrative schematic of a system 201 that can deliver treatment fluids (e.g., treatment fluid 116 of FIG. 1) to a downhole location, according to one or more embodiments. It should be noted that while FIG. 2 generally depicts a land-based system, it is to be recognized that like systems may be operated in subsea locations as well. As depicted in FIG. 2, system 201 may include mixing tank 210, in which a treatment fluid described herein may be formulated. The treatment fluid may be conveyed via line 212 to wellhead 214, where the treatment fluid enters tubular 216, tubular 216 extending from wellhead 214 into subterranean formation 218. Upon being ejected from tubular 216, the treatment fluid may subsequently penetrate into subterranean formation 218 and reduce or prevent, either temporarily or permanently, the flow of a fluid into a particular location (e.g., by creating a plug comprising the particulate diverting agents).

In some instances, upon being ejected from tubular 216, the treatment fluid may subsequently return up the wellbore in the annulus between the tubular 216 and the wellbore 222 as indicated by flow lines 224, for example, in a cementing operation. In other embodiments, the treatment fluid may be reverse pumped down through the annulus and up tubular 216 back to the surface, for example, in a reverse cementing operation.

In some instances, tubular 216 may have a plurality of orifices 226 through which the treatment fluid of the present disclosure may enter the wellbore proximal to a portion of the subterranean formation 218 to be treated, for example, in a fracturing operation or a gravel packing operation.

In some instances, the wellbore may further comprise equipment or tools (not shown) for zonal isolation of a portion of the subterranean formation 218 to be treated.

Pump 220 may be configured to raise the pressure of the treatment fluid to a desired degree before its introduction into tubular 216. It is to be recognized that system 201 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 214 and exit subterranean formation 218. In some embodiments, the treatment fluid that has flowed back to wellhead 214 may subsequently be recovered and recirculated to subterranean formation 218.

The system 201 may further include a control system 228 for performing the methods described herein (e.g., applying the 3-dimensional flow model 102 to the inputs 104 and comparing 112 the fluid properties 106 needed to suspend and transport the particulate diverting agent with the relationship 110 between the size characteristics of the nanoparticulate suspending agents and fluid properties to identify a fluid composition(s) 114 as illustrated in FIG. 1). In some instances, the control system 228 may be communicably coupled 230 to the mixer 210, which may allow for automatically adjusting the treatment fluid composition on-the-fly to provide for the desired fluid composition.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

The foregoing methods and analyses may be performed, at least in part, using a control system (e.g., control system 228 of FIG. 2). The processor and corresponding computer hardware used to implement the various illustrative blocks, modules, elements, components, methods, and algorithms described herein may be configured to execute one or more sequences of instructions, programming stances, or code stored on a non-transitory, computer-readable medium (e.g., a non-transitory, tangible, computer-readable storage medium containing program instructions that (1) cause a computer system running the program of instructions to perform method steps or (2) cause other components/tools to perform method steps described herein). The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMs, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the methods and analyses described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, and flash EPROM.

Embodiments described herein include, but are not limited to, Embodiment A, Embodiment B, Embodiment C, Embodiment D, Embodiment E, Embodiment F, Embodiment G, Embodiment H, and Embodiment I.

Embodiment A is a method comprising: deriving fluid properties that provide for suspension of particulate diverting agents using a 3-dimensional flow model and based on a downhole temperature and at least one size characteristic of the particulate diverting agents; identifying a treatment fluid composition that comprises a nanoparticulate suspending agent and achieves the fluid properties using a relationship between the treatment fluid composition and the fluid properties; and optionally preparing a treatment fluid or a treatment fluid additive based on (e.g., similar to or according to) the treatment fluid composition.

Embodiment B is a system comprising: a pump fluidly connected to a wellbore penetrating a subterranean formation that introduces a treatment fluid into the wellbore; and a non-transitory computer-readable medium communicably coupled to the system and encoded with instructions that, when executed, cause the system to perform the method according to Embodiment A.

Embodiment C is a non-transitory computer-readable medium encoded with instructions that, when executed, cause a system to perform a method according to Embodiment A.

Embodiments A-C may optionally further include one or more of the following: Element 1: wherein the fluid properties derived by the 3-dimensional flow model provides for at least 50% of the particulate diverting agents being within a bottom 10% of a fracture height over a 5-foot distance, and the method further comprises: treating a subterranean formation with the treating fluid for near-field diversion; Element 2: wherein the fluid properties derived by the 3-dimensional flow model provides for less than 25% of the particulate diverting agents being within a bottom 10% of a fracture height at a fracture half-length, and the method further comprises: treating a subterranean formation with the treating fluid for far-field diversion; Element 3: wherein preparing the treatment fluid or the treatment fluid additive is performed in real-time; Element 4: the method further comprising: deriving the relationship between the treatment fluid composition and the fluid properties; Element 5: wherein the 3-dimensional flow model incorporates Navier-Stokes equations; Element 6: wherein the fluid properties comprise at least one selected from the group consisting of: dynamic viscosity, kinematic viscosity, elasticity, and any combination thereof; Element 7: wherein the treatment fluid comprises an aqueous base fluid and the nanoparticulate suspending agent; Element 8: wherein the treatment fluid comprises an aqueous base fluid, the nanoparticulate suspending agent, and a viscosifier; Element 9: wherein the treatment fluid additive comprises the nanoparticulate suspending agent and a viscosifier; and Element 10: wherein preparing the treatment fluid is at a well site, and the method further comprises: adjusting a concentration of the nanoparticulate suspending agent in the treatment fluid on-the-fly based on the treatment fluid composition. Exemplary combination may include, but are not limited to Element 1 or 2 in combination with one or more of Elements 3-10; Element 3 in combination with one or more of Elements 4-10; two or more of Elements 4-6 in combination and optionally in further combination with one or more of Elements 7-10; one of Elements 4-6 in combination with one or more of Elements 7-10.

Embodiment D is a method comprising: deriving fluid properties that provide for suspension of particulate diverting agents using a 3-dimensional flow model that incorporates Navier-Stokes equations and is based on a downhole temperature and at least one size characteristic of the particulate diverting agents; deriving a relationship between a treatment fluid composition that comprise a nanoparticulate suspending agent and the fluid properties; identifying the treatment fluid composition that achieves the fluid properties using the relationship between the treatment fluid composition and the fluid properties; and optionally performing a treatment operation using a treatment fluid prepared based on (e.g., similar to or according to) the treatment fluid composition.

Embodiment E is a system comprising: a pump fluidly connected to a wellbore penetrating a subterranean formation that introduces a treatment fluid into the wellbore; and a non-transitory computer-readable medium communicably coupled to the system and encoded with instructions that, when executed, cause the system to perform the method according to Embodiment D.

Embodiment F is a non-transitory computer-readable medium encoded with instructions that, when executed, cause a system to perform a method according to Embodiment D.

Embodiments D-F may optionally further include one or more of the following: Element 1; Element 2; Element 3; Element 6; Element 7; Element 8; and Element 10. Exemplary combinations may include, but are not limited to, Element 1 or 2 in combination with one or more of Elements 6, 7, 8, and 10; and Element 7 or 8 in combination with one or both of Elements 6 and 10.

Embodiment G is a method comprising: deriving fluid a dynamic viscosity, a kinematic viscosity, elasticity, or a combination thereof that provide for suspension of particulate diverting agents using a 3-dimensional flow model that incorporates Navier-Stokes equations and is based on a downhole temperature and at least one size characteristic of the particulate diverting agents; identifying a treatment fluid composition that comprises a nanoparticulate suspending agent and achieves the dynamic viscosity, the kinematic viscosity, the elasticity, or the combination thereof using a relationship between the treatment fluid composition and the dynamic viscosity, the kinematic viscosity, the elasticity, or the combination thereof; and optionally performing a treatment operation using a treatment fluid prepared based on (e.g., similar to or according to) the treatment fluid composition, wherein the treatment fluid comprises an aqueous base fluid, the nanoparticulate suspending agent, and the particulate diverting agents.

Embodiment H is a system comprising: a pump fluidly connected to a wellbore penetrating a subterranean formation that introduces a treatment fluid into the wellbore; and a non-transitory computer-readable medium communicably coupled to the system and encoded with instructions that, when executed, cause the system to perform the method according to Embodiment G.

Embodiment I is a non-transitory computer-readable medium encoded with instructions that, when executed, cause a system to perform a method according to Embodiment G.

The at least one size characteristic that the 3-dimensional flow model of Embodiments A-I may be selected from the examples provided herein or other metrics of the size of the particles. For example, the 3-dimensional flow model of Embodiments A-I may be based on a downhole temperature, the d-10 value, and the d-50 value (based on particle size number distribution). In another example, the 3-dimensional flow model of Embodiments A-I may be based on a downhole temperature, the aspect ratio, and the average diameter based on particle size number distribution.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments described herein. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the embodiments disclosed herein are presented herein. Not all features of a physical implementation are described or shown in this application for the sake of clarity. It is understood that in the development of a physical embodiment incorporating the embodiments described herein, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1

A 3-dimensional flow model was used to simulate the flow of 10 diverting agent particles in a fracture geometry. The fracture geometry was input to the 3-dimensional flow model. The 10 diverting agent particles were placed at various vertical heights along the fracture. The model was then run with different particulate diverting agent diameters from 5 mm to 25 mm, treatment fluid viscosities varying from 1 cP to 1000 cP, and particulate diverting agent densities varying from 1 g/cm$^3$ cP to 2.5 g/cm$^3$ (see Table 1). The settling of the individual diverting agent particles was monitored over the length of the fracture. The movement of the individual diverting agent particles is illustrated in FIGS. 3-7 for different viscosities and particulate diverting agent density.

TABLE 1

| Simulation | Particulate Diverting Agent Diameter (mm) | Treatment Fluid Viscosity (cP) | Particulate Diverting Agent Density (g/cm$^3$) | FIG. |
|---|---|---|---|---|
| 1 | 5 | 1 | 1000 | 3 |
| 2 | 5 | 1 | 1 | 4 |
| 3 | 25 | 2.5 | 1000 | 5 |
| 4 | 10 | 2.5 | 1000 | 6 |
| 5 | 5 | 2.5 | 1000 | 7 |

As illustrated in the figures, significant settling of the individual diverting agent particles is seen in Simulation 2. To a lesser degree, settling of the individual diverting agent particles is seen in Simulations 1 and 3. Whereas, Simulations 4 and 5 exhibit less settling of the individual diverting agent particles. This example illustrates that a 3-dimensional flow model may be used to assess particulate diverting agent settling. The settling of the particulate diverting agent may then be used to identify the proper treatment fluid composition to provide for near-field diversion, which can have settling, and far-field diversion, which prefers minimal settling to maximize penetration of the particulate diverting agents.

While the examples illustrate the 3-dimensional flow model using 10 particulates, any number of particulates may be used. Additionally, while the examples illustrate the 3-dimensional flow model using particulates of the same size for individual simulations, a simulation may be performed with two or more types of particles that differ based on the particle density, one or more of the particle size characteristics, or the like.

Therefore, the embodiments described herein are well adapted to attain the ends and advantages mentioned as well as those that are inherent therein. The particular embodiments disclosed above are illustrative only, as the embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   deriving fluid properties that provide for the suspension of a particulate diverting agent using a 3-dimensional flow model incorporating Navier-Strokes equations and based on a downhole temperature and at least one size characteristic of the particulate diverting agent;
   identifying a treatment fluid composition that comprises a nanoparticulate suspending agent and achieves the derived fluid properties; and preparing a treatment fluid or a treatment fluid additive by combining the identified fluid composition with the particulate diverting agent and the nanoparticle suspending agent wherein the treatment fluid or treatment fluid additive has the derived fluid properties; wherein the particulate diverting agent is selected from the group consisting of polysaccharides, lignosulfonates, chitins, chitosans, proteins, fatty alcohols, fatty esters, fatty acid salts, aliphatic polyesters, poly(lactic acid), poly(glycolic acid), poly(Σ-caprolactones), polyoxymethylene, polyurethanes, poly(hydroxybutyrates), poly(anhydrides), aliphatic polycarbonates, polyvinyl polymers, acrylic-based polymers, poly(amino acids), poly(aspartic acid), poly(alkylene oxides), poly(ethylene oxides), polyphosphazenes, poly(orthoesters), poly(hydroxy ester ethers), polyether esters, polyester amides, polyamides, polyhydroxyalkanoates, polyethyleneterephthalates, polybutlyenetherephthalates, polyethylenenaphthalenates, copolymers thereof, and any combinations thereof; performing a subterranean treatment operation using the treatment fluid or treatment fluid additive prepared based on the treatment fluid composition; and obstructing fluid flow into a portion of a subterranean formation with the particulate diverting agent; wherein the fluid properties derived by the 3-dimensional flow model provides for less than 25% of the particulate diverting agents being within a bottom 10% of a fracture height at a fracture half-length.

2. The method of claim 1, wherein preparing the treatment fluid or the treatment fluid additive is performed in real-time.

3. The method of claim 1, wherein the fluid properties comprise at least one selected from the group consisting of: dynamic viscosity, kinematic viscosity, elasticity, and any combination thereof.

4. The method of claim 1, wherein the treatment fluid comprises an aqueous base fluid.

5. The method of claim 1, wherein the treatment fluid comprises an aqueous base fluid, and a viscosifier.

6. The method of claim 1, wherein the treatment fluid additive comprises a viscosifier.

7. The method of claim 1,
adjusting a concentration of the nanoparticulate suspending agent in the treatment fluid on-the-fly based on the treatment fluid composition.

8. A method comprising:
deriving fluid properties that provide for suspension of particulate diverting agent using a 3-dimensional flow model that incorporates Navier-Stokes equations and is based on a downhole temperature and at least one size characteristic of the particulate diverting agent; wherein the fluid properties comprise at least one selected from the group consisting of: dynamic viscosity, kinematic viscosity, elasticity, and any combination thereof;
identifying the treatment fluid composition that comprises a nanoparticulate suspending agent and achieves the derived fluid properties; preparing a treatment fluid or treatment fluid additive by
combining the identified fluid composition with the particulate diverting agent wherein the treatment fluid or treatment fluid additive has the derived fluid properties; wherein the particulate diverting agent is selected from the group consisting of polysaccharides, lignosulfonates, chitins, chitosans, proteins, fatty alcohols, fatty esters, fatty acid salts, aliphatic polyesters, poly(lactic acid), poly(glycolic acid), poly(Σ-caprolactones), polyoxymethylene, polyurethanes, poly(hydroxybutyrates), poly(anhydrides), aliphatic polycarbonates, polyvinyl polymers, acrylic-based polymers, poly(amino acids), poly(aspartic acid), poly(alkylene oxides), poly(ethylene oxides), polyphosphazenes, poly(orthoesters), poly(hydroxy ester ethers), polyether esters, polyester amides, polyamides, polyhydroxyalkanoates, polyethyleneterephthalates, polybutyleneterephthalates, polyethylenenaphthalenates, copolymers thereof, and any combination thereof; and
performing a subterranean treatment operation using the treatment fluid or treatment fluid additive prepared based on the treatment fluid composition to obstruct fluid flow into a portion of a subterranean formation with the particulate diverting agent; wherein the fluid properties derived by the 3-dimensional flow model provides for less than 25% of the particulate diverting agents being within a bottom 10% of a fracture height at a fracture half-length.

9. The method of claim 8, wherein preparing the treatment fluid or the treatment fluid additive is performed in real-time.

10. The method of claim 8, wherein the treatment fluid comprises an aqueous base fluid.

11. The method of claim 8, wherein the treatment fluid comprises an aqueous base fluid and a viscosifier.

12. A method comprising:
deriving a dynamic viscosity, a kinematic viscosity, elasticity, or a combination thereof that provide for the suspension of a particulate diverting agent using a 3-dimensional flow model that incorporates Navier-Stokes equations and is based on a downhole temperature and at least one size characteristic of the particulate diverting agent;
identifying a treatment fluid composition that comprises a nanoparticulate suspending agent, aqueous base fluid, and a particulate diverting agent, and achieves the dynamic viscosity, the kinematic viscosity, the elasticity, or the combination thereof preparing a treatment fluid or treatment fluid additive by;
combining the identified fluid composition with the nanoparticulate suspending agent, aqueous base fluid, and particulate diverting agent wherein the treatment fluid or treatment fluid additive has the derived fluid properties; wherein the particulate diverting agent is selected from the group consisting of polysaccharides, lignosulfonates, chitins, chitosans, proteins, fatty alcohols, fatty esters, fatty acid salts, aliphatic polyesters, poly(lactic acid), poly(glycolic acid), poly(Σ-caprolactones), polyoxymethylene, polyurethanes, poly(hydroxybutyrates), poly(anydrodes), aliphatic polycarbonates, polyvinyl polymers, acrylic-based polymers, poly(amino acids), poly(orthoesters), poly(hydroxy ester ethers), polyether esters, polyester amides, polyamides, polyhydroxyalkanoates, polyethyleneterephthalates, polybutyleneterephthalates, polyethylenenaphthalenates, copolymers thereof, and any combinations thereof; and
performing a subterranean treatment operation using the treatment fluid or treatment fluid additive to obstruct fluid flow into a portion of a subterranean formation with the particulate diverting agent; wherein the fluid properties derived by the 3-dimensional flow model provides for less than 25% of the particulate diverting agents being within a bottom 10% of a fracture height at a fracture half-length.

13. The method of claim 12, wherein the treatment fluid further comprises a viscosifier.

14. The method of claim 12, further comprising adjusting a concentration of the nanoparticulate suspending agent in the treatment fluid on-the-fly based on the treatment fluid composition.

15. The method of claim 12, wherein preparing the treatment fluid is performed in real-time.

\* \* \* \* \*